Aug. 1, 1944.  E. F. FISHER  2,354,677
AIR AND GAS CLEANER
Filed June 1, 1942  2 Sheets-Sheet 1
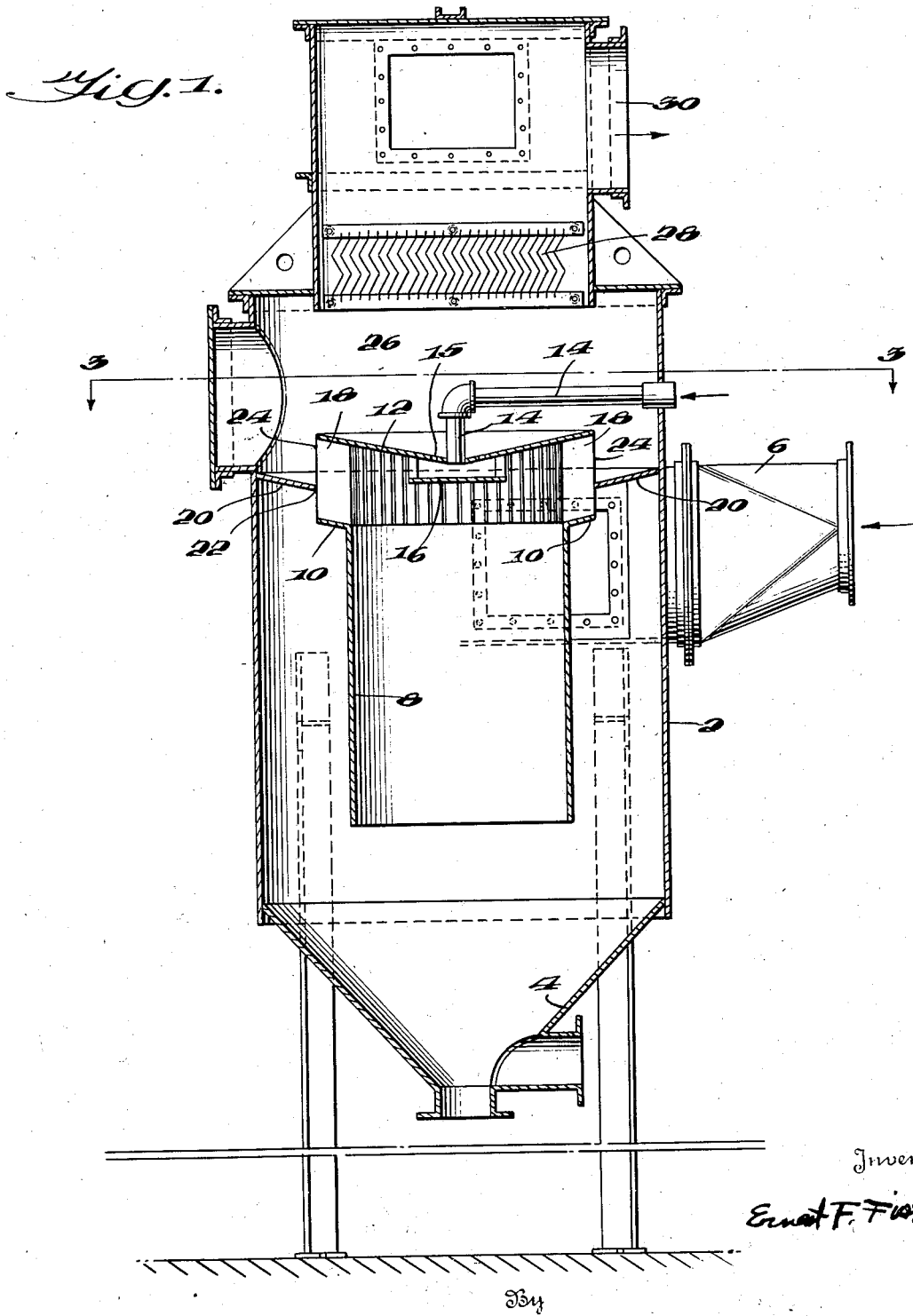

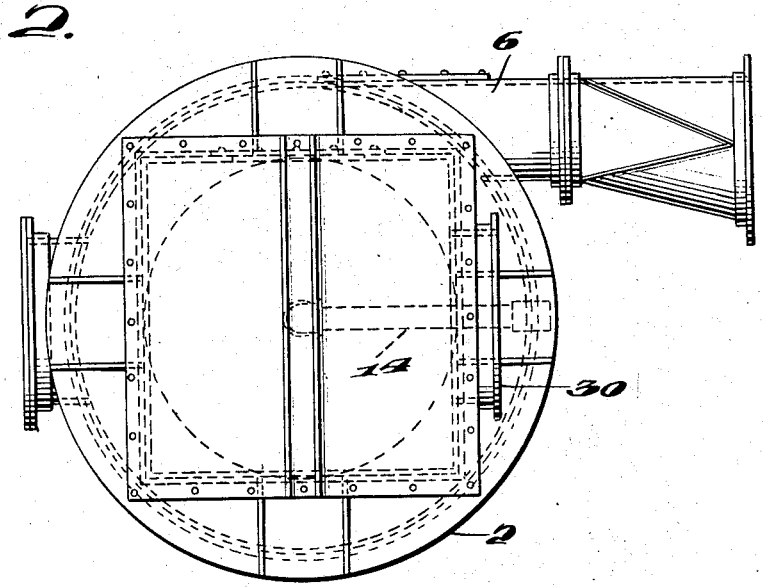
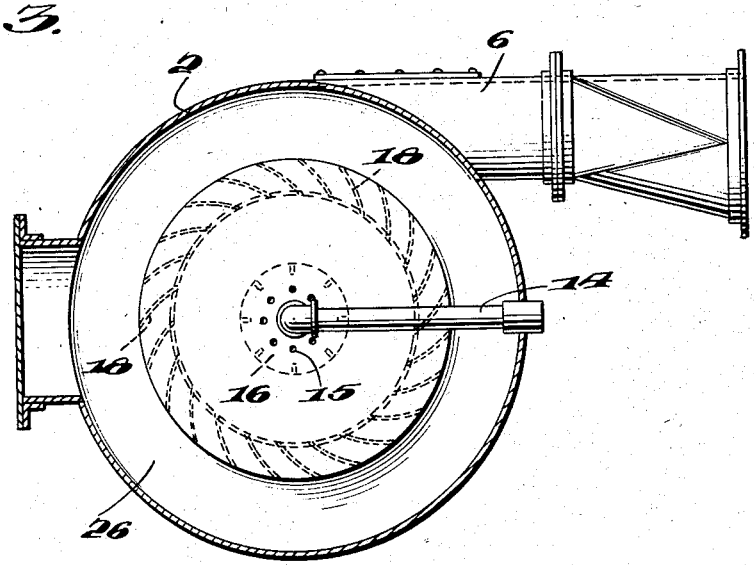

Patented Aug. 1, 1944

2,354,677

UNITED STATES PATENT OFFICE 2,354,677

AIR AND GAS CLEANER

Ernest F. Fisher, Boston, Mass.

Application June 1, 1942, Serial No. 445,324

6 Claims. (Cl. 183—25)

This invention is a gas cleaner, having some features in common with the cleaner shown in my Patent 2,259,033 granted Oct. 14, 1941, and in my application Serial Number 444,583, filed may 26, 1942.

The cleaner of the present invention is of the type wherein gas is brought into intimate contact with the liquid, the liquid serving to precipitate and cleanse the gas from suspended dust and other materials. The gas being cleaned is usually air, and liquid used is usually water, and the invention will be so described, without, however, limiting the invention to the use of air or water.

In the present invention, dust laden air is passed upwardly through a large vertically positioned open-ended tube and then passes laterally outwardly through swirling vanes, a heavy stream of water being simultaneously projected through and against the swirling vanes for bringing the air and water into intimate contact. The principal object of the present invention is to effect a separation of the air passing outwardly through the swirling vanes into two portions, one portion being caused to recirculate downwardly and then upwardly through the open-ended tube, this recirculation of a portion of the dust laden air serving to more thoroughly clean the air of its burden of dust and other impurities.

More specifically, the invention comprises swirling vanes above the top of the open-ended tube, in combination with a baffle ring positioned adjacent the vertical discharge edges of the swirling vanes at an intermediate position along their outer vertical edges, that is to say, positioned between the upper and lower edges of the swirling vanes, whereby this baffle ring splits the air leaving the swirling vanes into two parts, that part passing below the baffle ring being caused to recirculate through the tube. The baffle ring also directs some of the water onto the swirling vanes, so that some of the water passing through such vanes will be entrained by the air that passes through the vanes, below the baffle, for wetting the annular space around the tube, while the rest of the water passes down on the inside of the vertical tube for keeping it wet.

Further advantages of structure and operation will be apparent from the accompanying drawings, in which:

Fig. 1 is a vertical cross section through the cleaner of the present invention;

Fig. 2 is a top plan view; and

Fig. 3 is a section on the line 3—3 of Fig. 1.

Referring now to these drawings, the cleaner comprises a vertically disposed casing 2 having a conical collecting bottom 4 for the dust, water and sludge. Dust-laden air is led into the casing through the tangential air inlet 6.

Positioned centrally and vertically in the casing is a large open-ended tube 8 provided at its upper edge with an outwardly turned, inclined flange 10.

Positioned centrally above the tube 8 is a disc baffle 12 which slopes inwardly to its center, at which point a water inlet pipe 14 passes therethrough. Baffle 12 has drain holes 15 therethrough. Just below the lower end of pipe 14 there is positioned a deflecting plate 16 which deflects water laterally and radially in all directions through vertically positioned, angularly placed swirling vanes 18, these vanes being placed between flange 10 and the outer portion of the baffle 12. The water deflected by plate 16 is projected over the entire surfaces of the vanes 18; as the water travels laterally, it drops somewhat by gravity, and so contacts and wets the lower portions of vanes 18, those portions below the inner edge of ring baffle 20. Some of this water is projected through the lower part of vanes 18, entraining with it some dust-laden air, which is thoroughly wetted and falls as sludge into the conical bottom 4. From a consideration of Fig. 3 it will be apparent that the vanes 18 give a circular motion to the water and air passing outwardly therethrough.

Coming now to the most important feature of the present invention, a baffle ring 20, which is downwardly and inwardly inclined, has its outer edge against the inside wall of the casing 2, while its inner edge 22 is substantially against vertical edges 24 of the vanes 18. Edge 22 need not actually be in contact with the vanes but this edge is preferably as close to said vanes as convenient.

From the described construction, it will be evident that the baffle ring 20 serves to split any gas and liquid passing outwardly through the swirling vanes 18 into two portions; the air and water passing above the ring 20 circulates with a rotary motion in the chamber 26 and thence passes upwardly through the droplet collector 28 and exit pipe 30. Most of the liquid will be collected by the ring 20 and will flow from its inner edge 22 over the lower portions of the vanes 18 onto the flange 10 and thence onto the inside of the tube 8, keeping the inside of the tube 8 thoroughly wet and clear of accumulated dust. The air and liquid passing through the vanes 18 below the ring 20 is given a rotary motion, joining with the air already rotating in that portion of the casing. Some of the water from plate 16 is projected through the lower part of vanes 18, below ring baffle 20, entraining with it some dust laden air, thereby wetting it and precipitating it as sludge in conical bottom 4. The air thus being recirculated, inasmuch as it passes below the ring 20, contains the more and heavier dust particles and so the valuable result is achieved of recirculating and washing again the air that carries the most dust and the heavier dust. The air and dust recirculated below ring 20 must pass through the sheet of water flowing downwardly and inwardly off the inner edge of ring baffle 20; this air and dust also is subjected to part of the water spray from the liquid spreader plate 12, and this air and dust also contacts the lower part of the wet baffles 18. Such recirculated air and dust are therefore thoroughly wetted, the result of which is that the wet dust drops as sludge into sludge collector 4, and the air thus recirculated is cleaned.

While the invention has been illustrated in some detail, it should be understood that the invention is not limited to the exact details shown, but may be carried out in other ways.

I claim as my invention:

1. A gas cleaner, comprising in combination, a vertically positioned casing, a tangential air inlet for said casing, a large vertically positioned open-ended tube in said casing, a disc baffle above the upper end of said tube, swirling vanes positioned between the outer portion of the disc baffle and the upper part of said tube, liquid spreading means below the disc baffle, for directing liquid laterally and outwardly into said swirling vanes, a liquid supply pipe passing through the disc baffle for supplying liquid under pressure to said liquid spreading means and a baffle ring extending from the inner wall of the casing to said swirling vanes, substantially meeting said vanes at points between their upper and lower edges, said ring serving to split the outwardly traveling liquid and gas into two portions, the air that passes below the baffle ring being forced to recirculate through the said large open-ended tube.

2. A gas cleaner, comprising in combination, a vertically positioned casing, a tangential air inlet for said casing, a large vertically positioned open-ended tube in said casing, a disc baffle above the upper end of said tube, swirling vanes positioned between the outer portion of the disc baffle and the upper part of said tube, a liquid spreading plate below the disc baffle, for directing liquid laterally and outwardly into said swirling vanes, a liquid supply pipe passing through the disc baffle for supplying liquid under pressure to said liquid spreading plate, and a downwardly and inwardly inclined baffle ring extending from the inner wall of the casing to said swirling vanes, substantially meeting said vanes at points between their upper and lower edges, said ring serving to split the outwardly traveling liquid and gas into two portions, the air that passes below the baffle ring being forced to recirculate through the said large open-ended tube, said inclined baffle ring also serving to collect and direct liquid onto the lower part of said swirling vanes, some of which liquid is entrained by the recirculated gas, and the rest of which serves to wet the interior vertical wall of said open-ended tube.

3. A gas cleaner, comprising in combination, a vertically positioned casing, a tangential air inlet for said casing, a large, vertically positioned, open-ended tube in said casing, having an outwardly inclined flange at the upper end thereof, a disc baffle above the upper end of said tube, swirling vanes positioned between the outer part of said disc baffle and said flange on the tube, liquid spreading means below the disc baffle, for directing liquid laterally and outwardly through said swirling vanes, a liquid supply pipe passing through the disc baffle for supplying liquid under pressure to said liquid spreading means and a baffle ring, extending from the inner wall of the casing substantially to the outer vertical edges of said swirling vanes, at a level between the upper and lower edges of said vanes, said baffle ring serving to split outwardly traveling gas into two portions, the portion that passes below the baffle ring being forced to recirculate through said large tube.

4. A gas cleaner, comprising in combination, a vertically positioned casing, a tangential air inlet for said casing, a large, vertically positioned, open-ended tube in said casing, having an outwardly inclined flange at the upper end thereof, a disc baffle above the upper end of said tube, swirling vanes positioned between the outer part of said disc baffle and said flange on the tube, a liquid spreading plate, below the disc baffle, for directing liquid laterally and outwardly through said swirling vanes, a liquid supply pipe passing through the disc baffle for supplying liquid under pressure to said liquid spreading plate, and a downwardly and inwardly inclined baffle ring, extending from the inner wall of the casing substantially to the outer vertical edges of said swirling vanes, at a level between the upper and lower edges of said vanes, said baffle ring serving to split outwardly traveling gas into two portions, the portion that passes below the baffle ring being forced to recirculate through said large tube, said baffle ring and flange on the open-ended tube also serving to direct liquid downwardly and inwardly into the upper end of said open-ended tube for wetting the walls thereof.

5. A gas cleaner, comprising in combination, a vertically positioned casing, a gas inlet for said casing, a large, vertically positioned, open-ended tube in said casing, a disc baffle positioned centrally above the upper end of said tube, swirling vanes positioned between the disc baffle and the upper end of said tube, means below the disc baffle for directing liquid laterally and outwardly through the swirling vanes, a liquid supply pipe passing through the disc baffle for supplying liquid under pressure to said liquid spreading means and a baffle ring, positioned between the inner wall of the casing and the outer edges of said swirling vanes, placed to split the gas and liquid leaving the vanes into two portions, the liquid passing outwardly with the gas below the baffle ring serving to wet the interior of the casing, and the air passing outwardly below the baffle ring being forced to recirculate.

6. A gas cleaner, comprising in combination, a vertically positioned casing, a gas inlet for said casing, a large, vertically positioned, open-ended tube in said casing, a disc baffle positioned centrally above the upper end of said tube, swirling vanes positioned between the disc baffle and the upper end of said tube, a liquid spreading plate below the disc baffle for directing liquid laterally and outwardly through the swirling vanes, a liquid supply pipe passing through the disc baffle for supplying liquid under pressure to said liquid spreading plate, and a downwardly and inwardly inclined baffle ring, positioned between the inner wall of the casing and the outer edges of said swirling vanes, placed to split the gas and liquid leaving the vanes into two portions, the liquid passing outwardly with the gas below the baffle ring serving to wet the interior of the casing, and the air passing outwardly below the baffle ring being forced to recirculate, said baffle ring also serving to direct some liquid to the interior of said tube for wetting the inside walls thereof.

ERNEST F. FISHER.